United States Patent [19]
Chalupa et al.

[11] Patent Number: 5,751,128
[45] Date of Patent: May 12, 1998

[54] METHOD AND APPARATUS FOR ELECTRONICALLY COMMUTING AN ELECTRIC MOTOR

[75] Inventors: Leos Chalupa, Jemnice; Miroslav Patocka, Weissova, both of Czech Rep.

[73] Assignee: Motorola, Inc., Schaumburg, Ill.

[21] Appl. No.: 747,532

[22] Filed: Nov. 12, 1996

[51] Int. Cl.$^6$ ........................................ H01R 39/46
[52] U.S. Cl. ........................ 318/439; 318/138; 318/254
[58] Field of Search .......................... 318/254, 439, 318/138

[56] References Cited

U.S. PATENT DOCUMENTS

| | | | |
|---|---|---|---|
| 4,446,406 | 5/1984 | Uzuka | 318/254 |
| 4,743,815 | 5/1988 | Gee et al. | 318/254 |
| 5,221,881 | 6/1993 | Cameron | 318/254 |
| 5,376,866 | 12/1994 | Erdman | 318/254 |
| 5,517,095 | 5/1996 | Carobolante et al. | 318/254 |

*Primary Examiner*—William M. Shoop, Jr.
*Assistant Examiner*—Kim Lockett
*Attorney, Agent, or Firm*—Robert M. Handy; Ziye Zhou

[57] ABSTRACT

In a method for operating an electric motor especially a permanent magnet motor, the voltage applied to the windings of the stator of the motor are commuted electronically. The timing of the commutation events is determined by sensing and low pass filtering the differential voltages between the windings and detecting the zero crossings of the filtered differential voltages. At the time the zero crossings take place or within a short time afterwards the commutation events take place.

12 Claims, 4 Drawing Sheets

METHOD AND APPARATUS FOR ELECTRONICALLY COMMUTING AN ELECTRIC MOTOR

FIELD OF THE INVENTION

This invention relates in general to techniques of electronically commuting an electric motor, and more particularly to motors for usage in consumer appliances.

In conventional direct current rotating electric motors, commutation is essentially a mechanical switching operation to control the currents through the armature winding sections. This operation is accomplished in conventional motors with brushes and segmented commutators. In such constructions, the brushes wear and require frequent replacement. Sparking and its attendant generation of RF noise is also unavoidably present.

These disadvantages frequently prohibit use of direct current motors in critical applications even though the use of such motors might otherwise be favored. Early attempts to provide brushless direct current motors were mostly limited to: direct current to alternating current inversion and, essentially, alternating current induction motor operation; use of rotor velocity for switching control but such control then was not effective at all rotor positions; or use of circuits having a larger number of switching devices with the result that circuits for such devices were both complicated and expensive.

Any electric motor has intrinsic feed-backs, depending on the movement or on the load. It is known from the prior art that these behaviors can be used in order to create indirect sensors or observers, using PC-board or integrated electronics. The known prior art techniques mainly rely on a direct or indirect measurement of the voltage which is induced in the stator windings by the relative movement of the rotor and its electromagnetic field.

These techniques required a sophisticated measurement equipment to measure the zero crossings of the induced voltages. Also an accurate and stable zero reference voltage is required for measurement of the zero crossings with sufficient precision.

The underlying problem of the invention is therefore to provide an improved method and apparatus for electronically commuting an electric motor.

SUMMARY OF THE INVENTION

The problem of the invention is solved basically by applying the features laid down in the independent claims. Preferred embodiments are set out in the dependent claims.

The invention is suitable for both bridge or star connection of the stator windings. Due to fabrication tolerances especially low cost electric motors are not perfectly symmetric so that the star potential can be slightly shifted from the zero potential. The invention is particularly advantageous in that such a shift of the star potential does not influence the precision of the measurement of the zero crossings and thus the precision of the commutation events.

Since only a difference of voltages is measured instead of the induced voltages themselves no exact zero reference potential is required. The measurement of the zero crossing of the difference of the voltages can even be measured without a reference potential. This has the advantage that three wires are sufficient to connect the motor since a fourth wire is not required to measure and transmit the star potential. This is particularly advantageous in sealed arrangements, where each wire connection which penetrates the housing is expensive like it is the case for example for refrigerator motors.

Also it is not necessary to establish an artificial star potential by making usage of precision resistors. Motors embodying selected features of the invention are therefore readily adapted for applications where space requirements are at a minimum. For example, such motors are readily adapted to drive the compressor of a recreational vehicle or automobile air conditioning system from the output of an alternator or battery source.

Other applications are washing machine motors, automotive power steering motors and fans.

In such arrangements, an electronically commutated motor and compressor may both be sealed in a hermetic enclosure. In sealed arrangements, carbon pollution products are objectionable and use of brushless motors in such arrangements provides a distinct advantage over mechanical commutation. Since the units are hermetically sealed, the reliability of the motor must be very good.

For example in a refrigerator all parts of the motor must be such that refrigerant will neither damage the motor nor be damaged by motor components or the materials from which said components are made. Thus, another important advantage of the subject invention is the cost saving achieved due to simplified manufacture and robust and reliable operation.

BRIEF DESCRIPTION OF THE DRAWING

Other aspects of the present invention and their attendant advantages will become readily apparent from the following detailed description taken in conjunction with the accompanying figures in which like reference numerals are used to describe like parts throughout the views and embodiments.

DETAILED DESCRIPTION OF A PREFERRED EMBODIMENT

Figure 1:
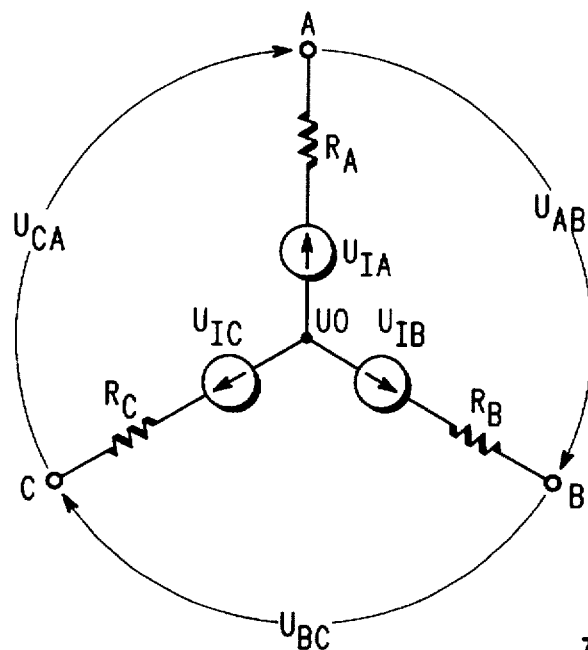
FIG. 1 shows a simplified equivalent circuit diagram of an electronically commutable permanent magnet motor.

Referring to FIG. 1, there is illustrated an equivalent circuit diagram of an electronically commutable, permanent magnet motor. The voltages which are induced in the stator windings by the movement of the rotor are symbolized by the voltage sources UIA, UIB and UIC. These voltage sources have one end connected at a common point which is the zero potential UO of the star configuration of the motor or with other words the star potential UO.

The resistors RA, RB and RC symbolize the resistance of each of the stator windings, respectively. The resistor RA is connected to the voltage source UIA, RB to UIB and RC to UIC. The points A, B and C denote the external connections of the motor for power supply. Between the supply terminals A and B the voltage UAB is applied, between B and C the voltage UBC and between C and A the voltage UCA.

In an ideal motor the value of the resistors RA, RB and RC is the same whereas the voltage sources UIA, UIB and UIC only differ as far as they are shifted for 120 degrees in phase relatively to each other. In practice however there is no perfect symmetry due to construction of the motor and/or manufacturing tolerances. As a consequence the star potential UO can be slightly shifted from the ideal zero potential in practice.

Figure 2:
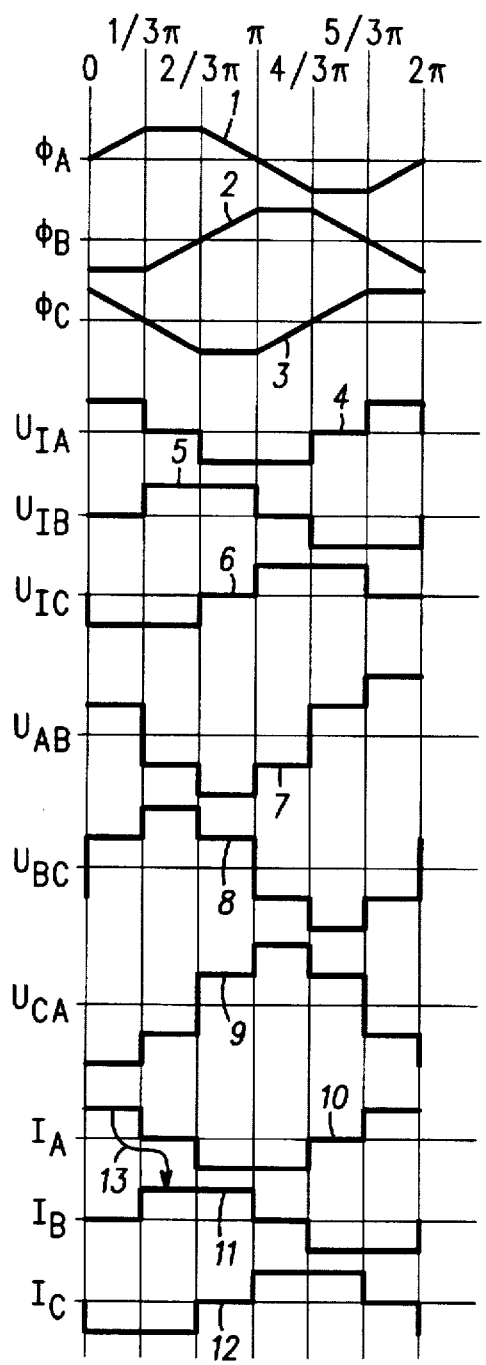
FIG. 2 illustrates the electrical characteristics of an ideal motor.

FIG. 2 shows the electrical characteristics of the motor for one revolution or with other words between the phase angle 0 and $2\pi$.

The curves 1, 2 and 3 illustrate the magnetic flux $\phi A$, $\phi B$ and $\phi C$ in the windings A, B and C, respectively. The curves 4, 5 and 6 illustrate the variation of the induced voltages UIA, UIB and UIC over time. The curves 7, 8 and 9 illustrate the voltages UAB, UBC and UCA which are applied between the supply terminals of the motor. All these aforementioned curves are shifted 120 degrees with respect to each other.

The curves 10, 11 and 12 illustrate the currents IA, IB and IC in the windings A, B and C, respectively. Due to the commutation only two of the windings A, B and C can conduct current at a given point of time. For example, during the time interval from 0 to $\frac{1}{3}\pi$ the current in winding A is positive, the current in winding B is 0 and the current in winding C is negative. This means that the current IA flows through the winding A and then back through the winding C, whereas winding B is switched off from the power supply by the commutator.

At the phase angle $\frac{1}{3}\pi$ a commutation event takes place. This is symbolized by the arrow 13 in FIG. 2. By the commutation the winding A is switched off and the winding B is switched on so that the current which flows through winding C stays the same but comes now from the terminal B instead of terminal A. An analogous situation occurs after each phase increment of $\frac{1}{3}\pi$ in the example shown in FIG. 2.

The curves 1 to 12 of FIG. 2 are good approximations of the real electrical characteristics of the motor. In reality the curves of the electrical characteristics are somewhat blurred as compared to the curves shown in FIG. 2 but for simplicity the idealized curves are shown.

If pulse width modulation or a similar technique is employed to connect the motor to a direct voltage source, the currents IA, IB and IC are chopped. By chopping the currents additional voltages are induced in the stator windings. If one neglects the relatively small ohmic resistors RA, RB and RC the differential voltage UAB between the terminals A and B can be expressed as follows:

$$U_{AB}(t)=U_{IA}(t)-U_{IB}(t)+L_A dI_A/dt+L_B dI_B/dt, \quad (1)$$

where LA and LB are the inductances of windings A and B, respectively. The differential voltages UBC and UCA can be expressed analogously.

Integration of the voltage UAB yields equation 2, $$U^*_{AB}(t) = \frac{1}{\Delta} \int_t^{t+\Delta} U_{AB}(t')dt' = U_{IA}(t) - U_{IA}(t) \quad (2)$$

where $\Delta$ is a certain time duration. The integration of the differential voltage UAB yields the voltage expression U*AB which is the differential voltage UAB after integration during a time window of length $\Delta$ or with other words after low pass filtering of UAB. If the time duration $\Delta$ is significantly greater than the period of the pulse width modulation or of the chopping and at the same time significantly shorter than a commutation period, the expressions in equation (1) which symbolize the induced voltages due to the pulse width modulation or due to the chopping can be neglected for evaluating equation (2) since they are about 0 in average.

As a consequence the low pass filtered differential voltage between the terminals A and B is a good approximation of the difference of the induced voltages UIA and UIB which are induced due to the rotation of the rotor in the stator windings. Likewise the low pass filtered differential voltages UBC and UCA are good approximations of the differences of the induced voltages UIB and UIC, and UIC and UIA, respectively. Hence, the low pass filtered differential voltages are indicative of the induced voltages due to the rotor movement and therefore of the rotor position. Therefore the points of time when a commutation has to take place can be derived from the low pass filtered differential voltages. Each time one of the low pass filtered differential voltages crosses zero a commutation event has to take place. This is explained in greater detail with reference to FIG. 3 and FIG. 4.

Figure 3:
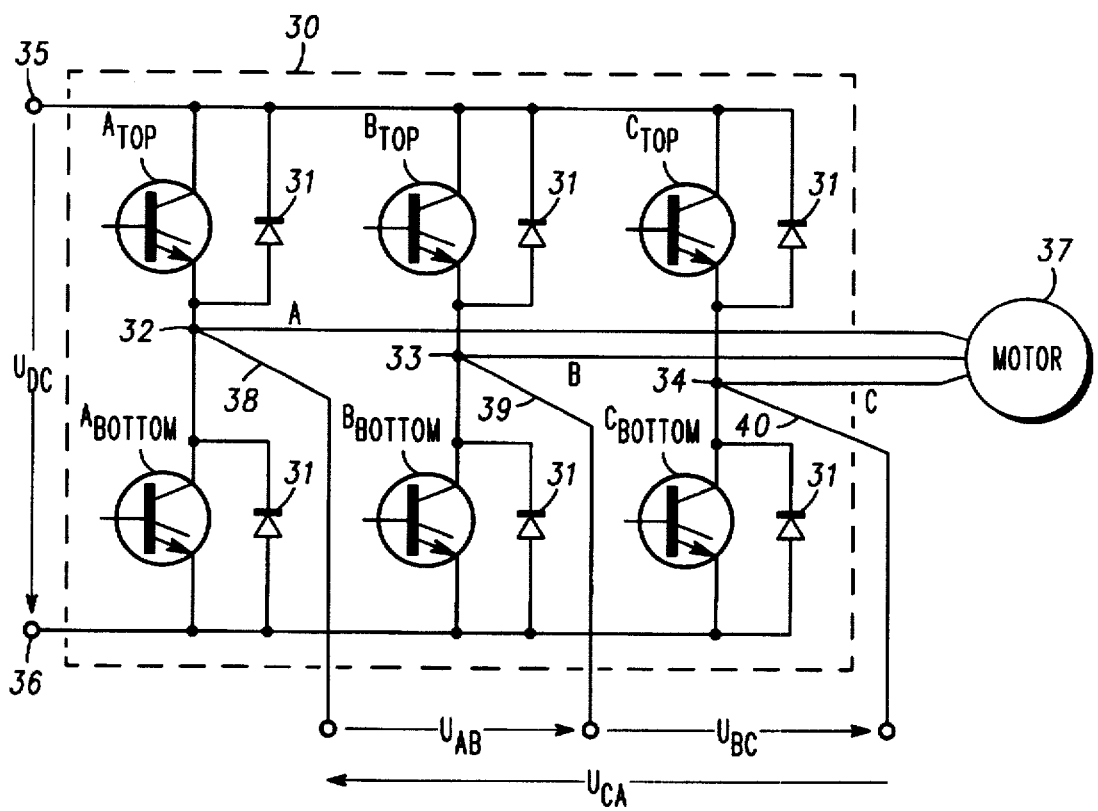
FIG. 3 is a circuit diagram of a power switch used for pulse width modulation (PWM) in accordance with the present invention.

FIG. 3 shows a power switch for usage for pulse width modulation. The power switch 30 comprises 6 transistors A-top, A-bottom, B-top, B-bottom, C-top and C-bottom. In the example considered here these transistors are of the IGBT type. The source and the drain of each of the transistors is connected by a diode 31. The source and the drain of the transistors A-top and A-bottom are connected at point 32. The same applies analogously for the transistors B-top and B-bottom, and C-top and C-bottom, which are connected at points 33 and 34, respectively. At the terminals 35 and 36 direct current voltage $U_{DC}$ is applied to the power switch 30. The phases A, B and C of the motor 37 are connected to the points 32, 33 and 34, respectively, of the power switch 30.

By switching on and off the transistors of the power switch 30 in an appropriate sequence a rotating field results in the motor 37 which drives the rotor. The timing of the switching operations is determined by the zero crossings of the filtered differential voltages. The differential voltages UAB, UBC and UCA are sensed via the lines 38, 39 and 40 which are connected to the points 32, 33 and 34, respectively.

Figure 4:
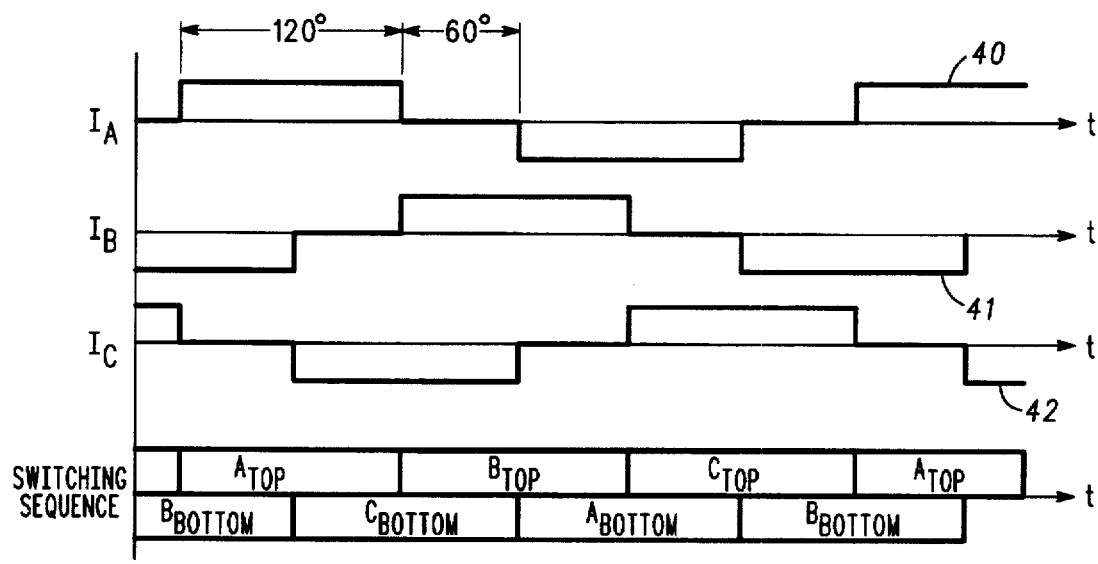
FIG. 4 is a timing diagram for the control of the power switch of FIG. 3.

FIG. 4 shows the timing of the phase currents IA, IB, IC by curves 40, 41 and 42, respectively. The curves 40, 41 and 42 correspond to curves 10, 11 and 12 in FIG. 2. On the bottom of FIG. 4 the corresponding switching sequence of the transistors of the power switch 30 is shown along the time axis t. For example A-top in the switching sequence means that the transistor A-top of the power switch 30 is switched on during a time interval as indicated in the switching sequence of FIG. 4 which equals the equivalent of a phase angle of 120 degrees or with other words $\frac{2}{3}\pi$.

Likewise A-bottom in the switching sequence shown in FIG. 4 means that the transistor A-bottom is switched on during the time as indicated in FIG. 4. The same applies analogously to the other transistors of the power switch 30.

If pulse width modulation or another chopping technique is used the transistors of the power switch 30 are switched on and off at a relatively high frequency when they are active according to the switching sequence. For example during the time duration A-top in the switching sequence the transistor A-top of the power switch 30 is switched on and off at the pulse width modulation frequency. The same applies analogously to the other transistors of the power switch.

Figure 5:
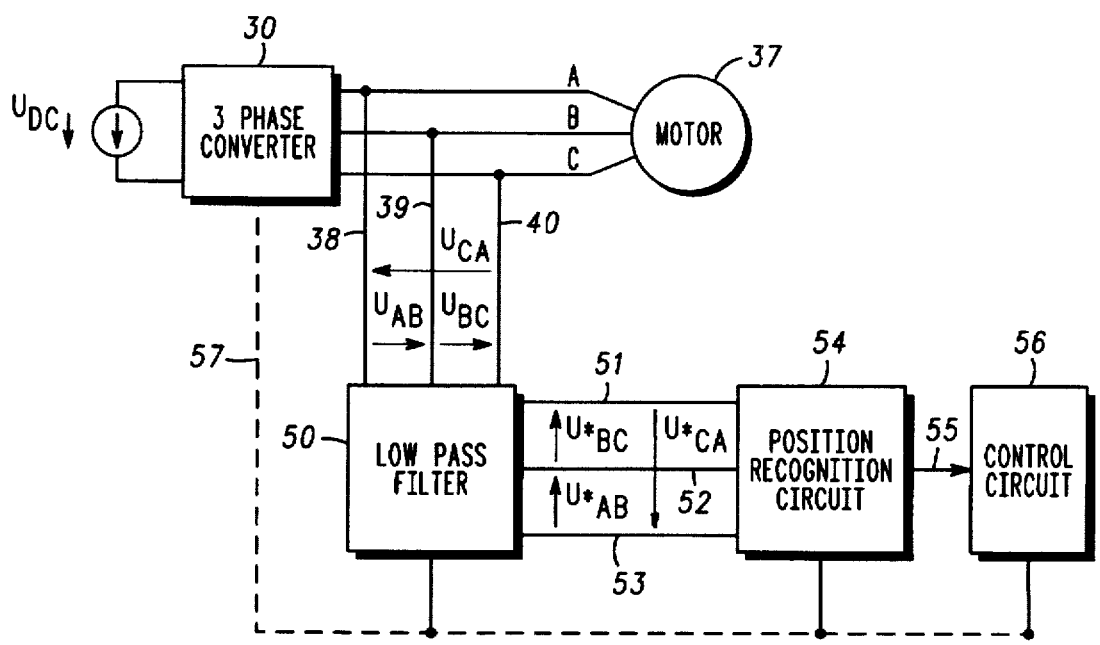
FIG. 5 is a block diagram of a preferred embodiment of the present invention.

FIG. 5 shows a block diagram of the control of the motor 37. Like elements in FIGS. 3 and 5 have like reference numerals. In the embodiment shown in FIG. 5 the power switch 30 is a three phase converter of the type as shown in FIG. 3.

The differential voltages UAB, UBC and UCA are sensed via the lines 38, 39 and 40, respectively which are connected to low pass filter 50. The low pass filer 50 integrates the differential voltages to filter out the high frequency components which are due to the pulse width modulation switching of the power switch 30.

The resulting low pass filtered differential voltages U*AB, U*BC and U*CA are outputted by the low pass filter 50 and transmitted via lines 51, 52 and 53 to position recognition circuit 54. Within position recognition circuit 54 the points of time when the filtered differential voltages become zero—or with other words the zero crossings of the filtered differential voltages—are determined. The zero crossings are indicative of the position of the rotor with respect to the stator of the motor 37. Each time the filtered differential voltage becomes zero this is signaled via line 55 to the control circuit 56. The control circuit 56 controls the switching operation of the power switch 30.

The control circuit 56 has stored therein the switching sequence shown in FIG. 4. Each time the control circuit 56 receives a signal via the line 55 it advances by one step in this switching sequence. This is also shown in the below table.

| STEP | A-TOP | A-BOTTOM | B-TOP | B-BOTTOM | C-TOP | C-BOTTOM |
|------|-------|----------|-------|----------|-------|----------|
| 0 | PWM | 0 | 0 | PWM | 0 | 0 |
| 1 | PWM | 0 | 0 | 0 | 0 | PWM |
| 2 | 0 | 0 | PWM | 0 | 0 | PWM |
| 3 | 0 | PWM | PWM | 0 | 0 | 0 |
| 4 | 0 | PWM | 0 | 0 | PWM | 0 |
| 5 | 0 | 0 | 0 | PWM | PWM | 0 |

This table is another representation of the switching sequence shown in FIG. 4. The switching sequence has six steps 0 to 5 as indicated in the left most column in the table. When a transistor is switched off this is indicated by a "0" in the table and when a transistor is active, this is indicated by "PWM" in the table.

Initially, at step 0, the control circuit 56 selects the transistors A-top and B-bottom for the pulse width modulation of the incoming direct current voltage UDC. The other transistors of the power switch 30 are switched off. When the control circuit 56 receives a signal via the line 55 from the position recognition circuit 54 which indicates a zero crossing of a filtered differential voltage, the control circuit goes to step 1. In step 1 the transistors A-top and C-bottom are selected for the pulse width modulation.

Likewise with the next signal which is received via the line 55 the control circuit goes to step 2 and so on. When step 5 is reached the control goes back to step 0 with the next signal received via the line 55. The signal lines between the control circuit 56 and the power switch 30 are not shown in FIG. 5 for simplicity.

The power switch 30 as well as the low pass filter 50, position recognition circuit 54 and control circuit 56 are connected to the same ground potential 57. This is possible since only the sensing of the differential voltages UAB, UBC and UCA is required and only the zero crossings of the filtered differential voltages has to be determined but not the zero crossings of the induced voltages UIA, UIB and UIC themselves. Therefore the ground potential 57 is independent from the potential UO and does not influence the required measurements.

Another advantage is that the position recognition circuit 54 does not need to be isolated by galvanic separation from the power switch 30 for the same reason. Therefore all control circuits can share the same ground potential 57. It is also possible to use different ground lines and different ground potentials since as set out before this does not influence the differential voltages.

This solution saves a number of wires to the motor 37, isolations from the power voltage level UDC and current sensors in comparison to the prior art technologies. Also, the measurement current can be relatively high due to the robustness of the employed measurement and control method of the invention.

Figure 6:
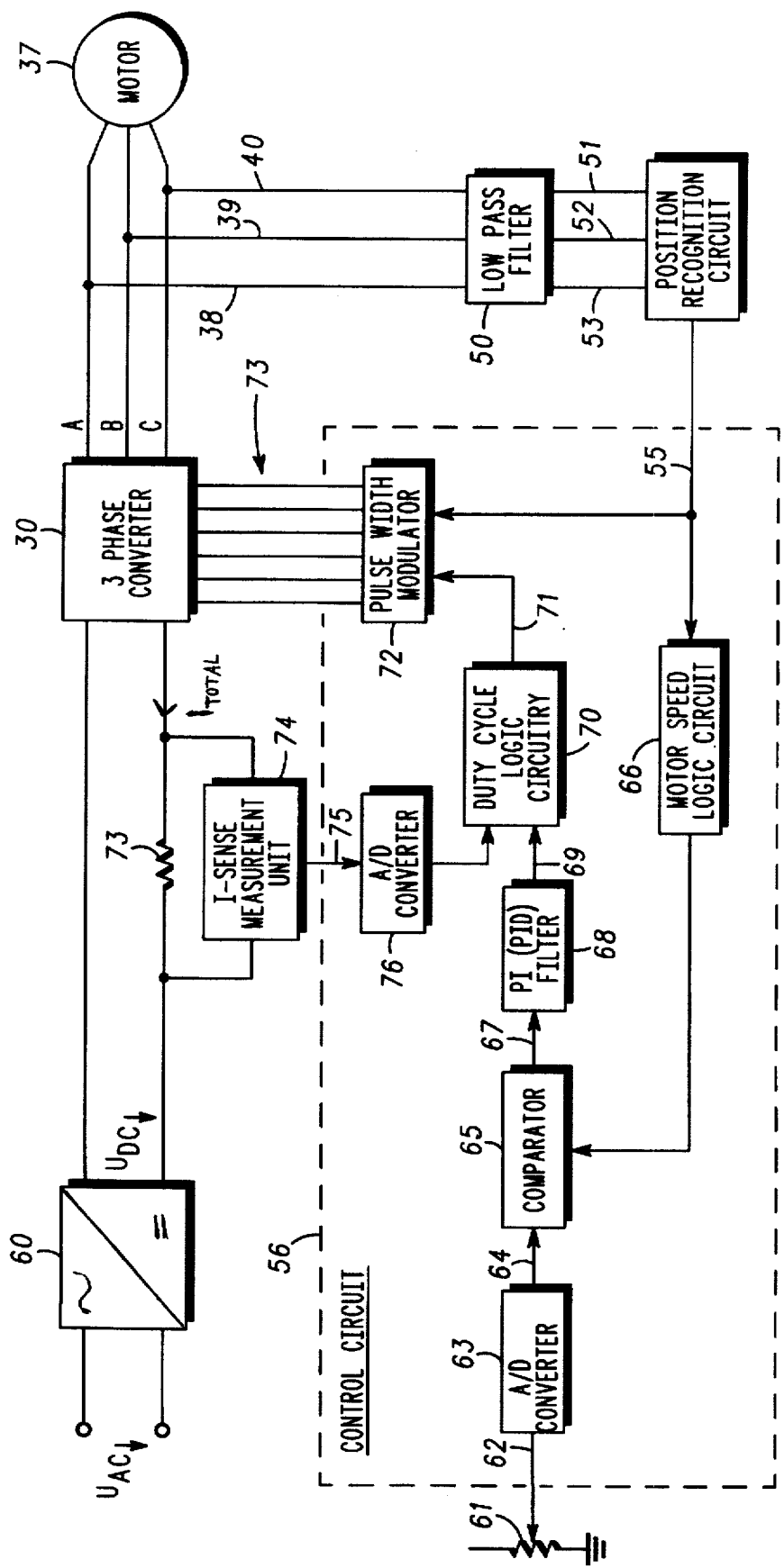
FIG. 6 is a block diagram of another preferred embodiment of the present invention.

FIG. 6 shows another preferred embodiment of the invention. Like elements of the apparatus shown in FIG. 6 and the apparatus of FIG. 5 are denoted with the same reference numerals.

An alternating voltage UAC is applied to an AC-DC converter 60 to produce the direct current voltage UDC. The direct current voltage UDC is connected to the power switch 30 like it is the case in the embodiment of FIG. 5. Also the respective interconnections of the motor 37, the low pass filter 50 and the position recognition circuit 54 remain the same as compared to FIG. 5.

Potentiometer 61 is connected to an input of the control circuit 56 via line 62. The potentiometer 61 serves to set the speed of the motor 37. The speed input value which is defined by adjusting the potentiometer 61 is converted from analog to digital by analog to digital (A–D) converter 63. The digitized value of the speed input value is transmitted via line 64 to comparator 65. The comparator 65 also receives a signal which is representative of the actual motor speed of the motor 37 from logic circuitry 66.

The input of the logic circuitry 66 is coupled to the line 55 in order to receive the signals issued from the position recognition circuit 54. The logic circuitry measures the time duration between two consecutive signals issued by the position recognition circuit 54 which indicate zero crossings of the filtered differential voltages. From the time duration between two consecutive signals issued by the position recognition circuit 54 the logic circuitry 66 calculates the actual motor speed of the motor 37.

Alternatively, the logic circuitry 66 can take into account a greater number of consecutive signals issued by the position recognition circuit 54 to calculate an average value of the actual motor speed 37 within the corresponding time window.

In the example considered here the comparator 65 subtracts the digitized speed input value from the actual motor speed value as determined by the logic circuitry 66. The comparator issues an error signal which is representative of the difference of the speed input value and the actual motor speed. The error signal is transmitted via line 67 from the comparator 65 to proportional-integral (PI) controller or filter 68. Alternatively the filter 68 can also be a proportional-integral-differential controller or filter (PID) or any other type of filter which has a similar filter characteristic.

The filtered error signal is outputted by the PI filter 68 via line 69 to logic circuitry 70. The logic circuitry 70 serves to determine the duty cycle of the pulse width modulation for the power switch 30. The duty cycle corresponds to the power delivered to the motor 37: a duty cycle of 100% means that the current is switched on for the whole pulse width modulation period whereas a smaller duty cycle means that the current is only switched on for a certain lower percentage of the total pulse width modulation period. If the filtered error signal received by the logic circuitry 70 via line 69 indicates that the motor speed is to be increased, the duty cycle is increased correspondingly by the logic circuitry 70.

Likewise, if the filtered error signal indicates that the motor speed of the motor 37 is to be decreased the duty cycle is decreased correspondingly by the logic circuitry 70.

The value of the duty cycle is transmitted from the logic circuitry 70 via line 71 to pulse width modulation (PWM) logic 72. The PWM logic 72 has six outputs which are connected to the power switch 30. Each of the outputs of the PWM logic 72 is connected to one of the transistors of the power switch 30 as shown in FIG. 3. In the PWM logic 72 the signals are generated to control the gates of the transistors of the power switch 30 according to the required duty cycle as determined by the logic circuitry 70 and also according to the signals inputted to the PWM logic 72 via line 55 from the position recognition circuit 54.

The PWM logic 72 controls the switching of the transistors of the power switch 30 according to the switching sequence as shown in FIG. 4 and in the above table.

In addition to the filtered error signal the total input current of the motor 37 can also be taken into account to determine the duty cycle in the logic circuitry 70. The total current $I_{total}$ flows through the resistor 73 between the AC–DC converter 60 and the power switch 30. The voltage drop over the resistor 73 is used to measure the current $I_{total}$ in the measurement unit 74 which senses the total current.

The measurement unit 74 delivers an analog signal which is transmitted via line 75 to analog to digital (A–D) converter 76. The output of the A–D converter 76 is coupled to the logic circuitry 70. The logic circuitry 70 is programmed so that it is optional that the signal delivered by the AD converter 76 is also taken into account for the determination of the duty cycle. If this alternative is chosen the signals delivered by the AD converter 76 and the filtered error signal delivered form the PI filter 68 are combined, e.g. superposed in the logic circuitry 70.

The way this superposition is done is depending on the motor characteristics of motor 37 as well as on the characteristics of the filters employed especially the characteristics of PI filter 68. Again, if the resulting value is indicative that the motor speed is to be increased, the logic circuitry 70 selects a higher duty cycle. As opposed to this if the resulting value of the superposition of the signals of the AD converter 76 and the PI filter 68 indicates that the motor speed of motor 37 should be decreased the logic circuitry 70 selects a lower duty cycle. In any case the duty cycle is only changed by the logic circuitry 70 if the filtered error signal changes or with other words if the speed input value and the actual motor speed as determined by the logic circuitry 66 are different.

Figure 7:
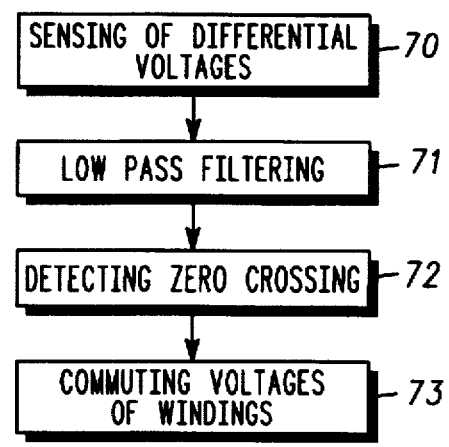
FIG. 7 is a flow chart illustrating a preferred embodiment of the method of the invention.

With respect to FIG. 7 a method of operating the motor 37 according to the invention is explained in greater detail. In step 80 differential phase voltages UAB, UBC and UCA are sensed like it is explained for example with reference to FIG. 5. The sensed differential voltages are low pass filtered in step 80 in order to eliminate the high frequency components which are due to the chopping of the current in the windings of the motor, e.g. motor 37. This yields the low pass filtered differential voltages.

In step 82 the zero crossings of the filtered differential voltages are determined to detect points of time when these voltages become zero. This serves to define the commuting events. The commutation of the applied phase voltages is carried out in step 83, for example by switching the appropriate transistors of the power switch 30. The commutation events can take place at substantially the same time when a zero crossing is detected or after a certain time delay which is due to restrictions or the technology employed.

While the invention has been described in connection with different embodiments thereof, variations will be readily apparent, to those skilled in the art from reading the foregoing description. It is to be clearly understood that this description is made only by way of example and not for purposes of limitation.

What is claimed is:

1. A method of operating an electric motor having a set of windings for producing a rotating magnetic field and a rotor adapted to rotate in response to said magnetic field, said method comprising the steps of sensing and low pass filtering the differential voltages between said windings;

detecting points of time when said filtered differential voltages become zero; and commuting the voltages applied to said windings from a power source in accordance with said detected points of time.

2. The method according to claim 1 further comprising the step of calculating the speed of said rotor from the duration between at least two of said points of time.

3. The method according to claim 2 further comprising the steps of comparing said calculated speed of said rotor with an speed input value and deriving an error signal therefrom; and changing a duty cycle of a pulse width modulation of said voltages applied to said windings in accordance with said error signal.

4. The method according to claim 3 further comprising the steps of sensing the total input current of said motor; and changing said duty cycle of said pulse width modulation according to said total input current, if an error signal occurs.

5. An apparatus for electronically commuting an electric motor, said motor having a set of windings with external connections coupled for power supply, the set of windings producing a rotating magnetic field to rotate a rotor in said motor, said apparatus comprising:

a low pass filter coupled to the external connections of said set of windings:

a sensor coupled to said low pass filter and sensing filtered differential voltages between said windings;

a position recognition circuit coupled to said sensor and detecting points of time when said filtered differential voltages become zero; and a control circuit coupled to said position recognition circuit and to the external connections of said set of windings, said control circuit commuting voltages applied to said set of windings from a power source in accordance with said detected points of time.

6. The apparatus of claim 5 further comprising a pulse width modulator coupled to said position recognition circuit and to said control circuit, said pulse width modulator modulating said voltages applied to said set of windings, a period of said pulse width modulation being short in comparison to a commutation period.

7. The apparatus of claim 6 further comprising a motor speed logic circuit coupled to said position recognition circuit and calculating a speed of said rotor from a duration between at least two of said points of time.

8. The apparatus according to claim 7 further comprising:

a comparator coupled to said motor speed logic circuit and coupled for receiving a speed control signal, said comparator comparing said calculated speed of said rotor with the speed control signal and deriving an error signal therefrom; and a duty cycle logic circuit coupled to said comparator and to said pulse width modulator, said duty cycle logic circuit adjusting a duty cycle of a pulse width modulation of said voltages applied to said set of windings in accordance with said error signal.

9. The apparatus according to claim 8 further comprising a sensor coupled to said control circuit and sensing a total input current of said motor, wherein said pulse width modulator is adapted to change said duty cycle according to said total input current, if said error signal occurs.

10. The apparatus according to claim 5 wherein said position recognition circuit and said control circuit are coupled to a ground potential.

11. An electric motor having a set of windings for producing a rotating magnetic field and a rotor adapted to rotate in response to said magnetic field, said electric motor further comprising means for electronically commuting an electric motor comprising means for sensing and low pass filtering the differential voltages between said windings;

means for detecting points of time when said filtered differential voltages become zero; and means for commuting voltages applied to said windings from a power source in accordance with said detected points of time.

12. A electric apparatus comprising an electric motor having a set of windings for producing a rotating magnetic field and a rotor adapted to rotate in response to said magnetic field, said electric motor further comprising means for electronically commuting an electric motor comprising means for sensing and low pass filtering the differential voltages between said windings;

means for detecting points of time when said filtered differential voltages become zero; and means for commuting voltages applied to said windings from a power source in accordance with said detected points of time.

* * * * *